April 26, 1966 H. BREIMER 3,248,478

CIRCUIT ARRANGEMENT FOR SEPARATING TWO SIGNALS FROM A COMPOSITE SIGNAL

Filed Oct. 2, 1962

INVENTOR
HENDRIK BREIMER
BY
Frank R. Jifari
AGENT

United States Patent Office 3,248,478
Patented Apr. 26, 1966

3,248,478

CIRCUIT ARRANGEMENT FOR SEPARATING TWO SIGNALS FROM A COMPOSITE SIGNAL

Hendrik Breimer, Emmasingel, Eindhoven, Netherlands, assignor to North American Philips Company, Inc., New York, N.Y., a corporation of Delaware Filed Oct. 2, 1962, Ser. No. 227,870
Claims priority, application Netherlands, Oct. 20, 1961, 270,463
11 Claims. (Cl. 178—5.4)

Figure 1:
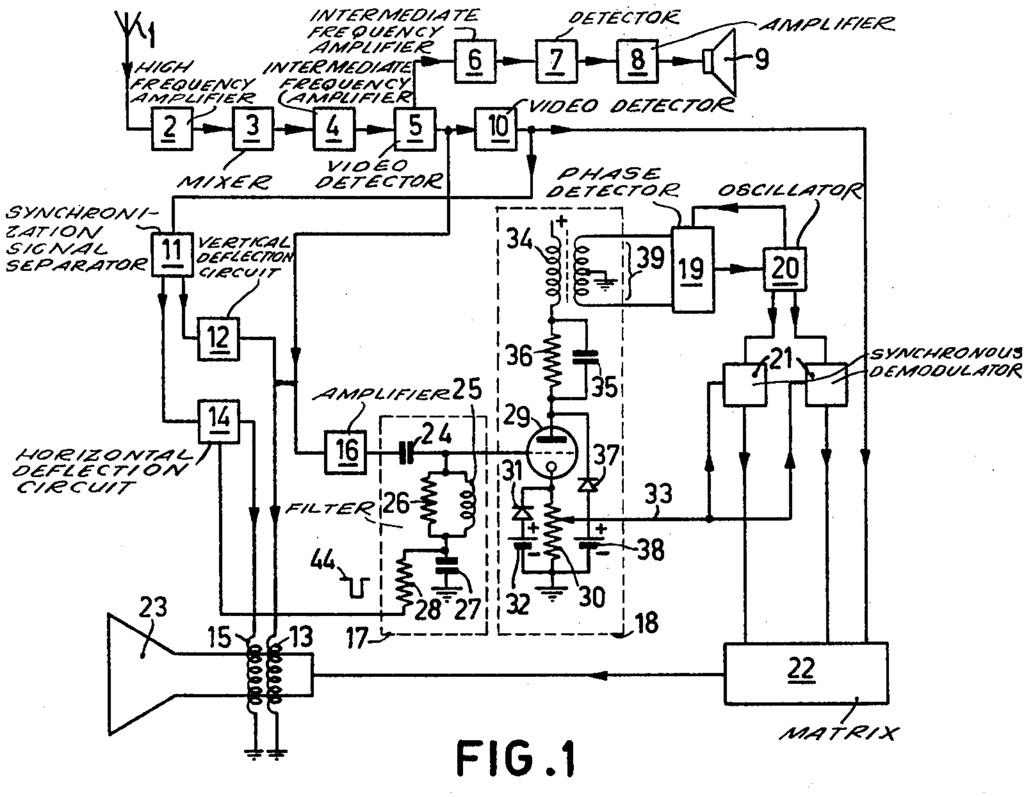

The invention relates to a circuit for separating two signals from a composite signal in which the two first mentioned signals occur alternately. The circuit arrangement includes an amplifying tube or a transistor which acts as a keying element. The composite signal and keying pulses are applied to a control electrode of the tube or transistor. The keying pulses coincide in time with one of the first mentioned signals. Under the influence of the keying pulses, the signal coinciding therewith is mainly produced across an impedance coupled to the anode of the tube or the collector of the transistor respectively and the other of the first mentioned signals is mainly produced across an impedance coupled with the cathode of the tube or with the emitter of the transistor respectively.

Such circuit arrangements are used, for example, in color television receivers to separate the color synchronizing signal and the chrominance signal from the color information signal in which the first mentioned two signals occur alternately. The color synchronizing signal occurs during the back porches of the line synchronizing signals of the color television signal and the chrominance signal occurring during the periods between the line synchronizing signals.

The color synchronizing signal is applied to a phase detector in which its frequency and phase are compared to the frequency and phase of a reference carrier wave which is generated by a local oscillator, and serves to demodulate the chrominance signal consisting of a modulated auxiliary carrier wave. The output voltage of the phase detector is used to control the oscillator. For correct control of the oscillator it is desirable for the color synchronizing signal to be available without the chrominance signal or parts thereof appearing at the input of the phase detector.

If, as is frequently the case, the back porches of the line synchronizing pulses are used as reference levels for circuits for restoring the direct-current component in one or more signals to be applied to the display tube of the receiver, it is also desirable for the chrominance signal to be available without the color synchronizing signal also appearing. As mentioned hereinbefore, this color synchronizing signal occurs during the back porches of the line synchronizing pulses. When these porches are used for restoring the direct-current components incomplete separation of the color synchronizing signal from the chrominance signal would give rise to incorrect color balance.

In a known circuit arrangement for the above described purposes positive-going keying pulses which coincide in time with the color synchronizing signal are applied to the control grid of an amplifying tube acting as a keying element. The color information signal is taken from the anode of a preceding amplifying tube and applied to the cathode of the keying tube.

During the absence of the keying pulses the keying tube is cut off so as to prevent the chrominance signal applied to the cathode during this time from reaching the phase detector coupled to the anode impedance. The cathode impedance of the keying tube is connected in parallel with the anode impedance of the preceding amplifying tube. Therefore to obtain sufficient amplification of the chrominance signal in the preceding amplifying tube the cathode impedance of the keying tube must have a sufficiently high resistance value.

When a keying pulse occurs the keying tube is rendered conductive. Thus for the color synchronizing signal applied to the cathode during the occurrence of a keying pulse the keying tube operates in grounded grid arrangement, for its grid is connected to ground with respect to the frequencies of the color information signal. Hence the color synchronizing signal is amplified in the keying tube and then applied to the phase detector. In this arrangement the keying tube together with its anode impedance forms a low impedance which is connected in parallel with the cathode impedance and thus forms a heavy load for the preceding amplifying tube. As a result the amplification of the preceding stage is reduced so that substantially no color synchronizing signal appears at the output for the chrominance signal.

Such a circuit arrangement, however, has the disadvantage that either the keying tube or the preceding amplifying stage provides no or substantially no power amplification, for during the absence of the keying pulses the keying tube is cut off and during the occurrence of the pulses the amplification of the preceding stage is greatly reduced owing to the heavy output load then imposed.

It is the object of the present invention to obviate this disadvantage. For this purpose the circuit arrangement in accordance with the invention is characterized in that the composite signal is applied to the control grid of the tube or to the base of the transistor respectively and that the anode impedance or the collector impedance respectively includes a network provided with an unidirectionally conductive element so that in the absence of the keying pulses the anode impedance or the collector impedance respectively has a low impedance value for the composite signal as compared with the instantaneous impedance value of the cathode impedance or the emitter impedance respectively, while in the presence of the keying pulses the anode impedance or the collector impedance respectively has a high impedance value for the composite signal as compared with the instantaneous impedance value of the cathode impedance or the emitter impedance respectively.

Figure 2:
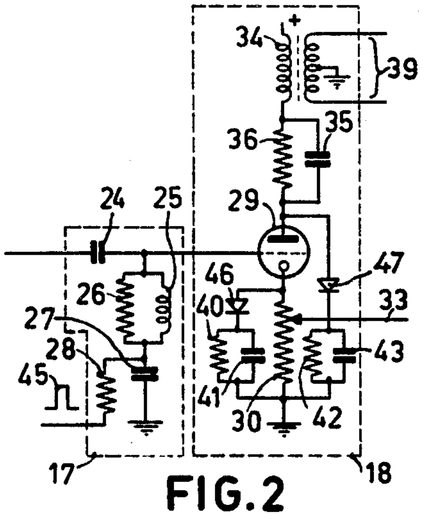

In order that the invention may readily be carried into effect, embodiments thereof will now be described, by way of example, with reference to the accompanying diagrammatic drawings, in which:

FIGURE 1 is the circuit diagram of a color television receiver provided with a circuit arrangement in accordance with the invention, and FIGURE 2 is a second embodiment of a circuit arrangement in accordance with the invention.

In FIGURE 1 reference numeral 1 designates an antenna system suited to the reception of a carrier wave modulated by a color television signal. The color television signal comprises a brightness signal, a chrominance signal consisting of two signals modulating an auxiliary color carrier wave in quadrature and containing information about the colors of the scene to be displayed, and an auxiliary sound carrier wave modulated by sound information. The brightness signal is provided with frame and line synchronizing pulses. The color synchronizing signal is contained in the back porches of the line synchronizing pulses. This color synchronizing signal comprises a few periods (8) of a sine wave the frequency of which corresponds to that of the auxiliary color carrier wave and which has a constant phase relationship with this carrier wave.

The signal received by the antenna system is fed through a high-frequency stage 2 and a mixer stage 3 to an intermediate-frequency amplifier 4 the output of which is connected to a video detector 5. The auxiliary sound carrier wave modulated by the sound signal may be separated from the picture signal either in the intermediate-frequency stage 4 or, if the inter-carrier sound principle is employed, in the video detector 5. In the embodiment shown this separation takes place in the video detector 5 from which the modulated sound carrier wave is fed through an intermediate frequency amplifier 6 to a detector 7. The low-frequency sound signal is fed after amplification in a low-frequency amplifier 8 to one or more loudspeakers 9.

The brightness signal taken from the video detector 5 is amplified in a video amplifier 10 and fed to a synchronization separator 11 in which the synchronizing pulses for the vertical deflection and the synchronizing pulses for the horizontal deflection are separated from the brightness signal. The synchronizing pulses for the vertical deflection are applied to a device 12 for synchronizing the sawtooth generator forming part of this device. The sawtooth output current of the device 12 is supplied to deflector coils 13 provided on a display tube 23.

The synchronizing pulses for the horizontal deflection are applied to a device 14 for synchronizing the sawtooth generator forming part of this device. The sawtooth output current of the device 14 is supplied to deflector coils 15 provided on the display tube 23. A direct voltage derived from the flyback of the line sawtooth generator may be taken from the device 14 in known manner and used as the high tension for the display tube.

The color information signal which is contained in the brightness signal taken from the video detector 5 and comprises the chrominance signal and the color synchronization signal is fed through an amplifier 16 to a chrominance bandpass filter 17 shown in greater detail. This filter passes only the color information signal and, of course, the frequencies of the brightness signal within the frequency range of the color information signal. In this circuit 17, keying pulses 44 of negative polarity, which may be derived in the device 14 from the flyback pulses produced in the sawtooth generator for the horizontal deflection, are added to the color information signal. The signal passed by the filter 17 is fed to the circuit arrangement in accordance with the invention which is designated by the numeral 18 and will be described in greater detail hereinafter. This circuit arrangement has two outputs at one of which (39) the color synchronizing signal appears and the chrominance signal is taken from the other output (33). The output 39 is connected to a phase detector 19 in which the frequency and the phase of the color synchronizing signal are compared with the frequency and the phase of the oscillation generated by an oscillator 20. The output voltage of the phase detector is used as the control voltage for the oscillator. From this oscillator are taken two sinusoidal oscillations having the same frequency but shifted 90° in phase with respect to one another and fed to synchronous demodulators 21. The chrominance signal produced by the circuit arrangement 18 is also applied to the synchronous demodulators. The two signals relating to the color content of the scene to be displayed are derived from the chrominance signal by the synchronous demodulators. The said two signals and the output signal of the video amplifier 10 are fed to a device 22. In this device the three signals are converted in known manner into signals suitable for controlling the display tube 23.

The devices 17 and 18 shown in FIGURE 1 will now be described more fully.

The device 17 comprises a bandpass filter for the color information signal applied through a capacitor 24, and an addition circuit. The bandpass filter comprises an inductance 25, the stray capacitance of this inductance, and a damping resistor 26 which is connected in parallel with the inductance and imparts the required bandwidth to the filter. A capacitor 27 is a short circuit between the filter and ground for the color information signal, but offers a high impedance to the keying pulses applied through a resistor 28. Since the inductance 25 has a low impedance for the keying pulses, both the color information signal and the keying pulses appear at the input of the circuit 18.

The keying pulses are derived from the flyback pulses in a manner such as to be present during the occurrence of the color synchronizing signal and to be absent during the occurrence of the chrominance signal. The resulting signal is applied to the control grid of the keying tube 29. The output 33 for the chrominance signal is connected to the cathode impedance of this tube and the output 39 for the color synchronizing signal is connected to the anode impedance. In the embodiment shown the cathode impedance comprises the parallel combination of a potentiometer 30 and a network consisting of the series combination of a diode 31 and a bias voltage source 32. The anode impedance comprises a balancing transformer 34, an RC-network consisting of a resistor 36 and a capacitor 35, and a network which consists of the series combination of a diode 37 and a bias voltage source 38 connected between the anode of the keying tube and ground.

In the absence of a keying pulse a large current flows through the tube 29. This current produces a large potential drop across the resistor 36 so that the mean anode voltage is low. The polarity of the diode 37, the polarity of the voltage source 38 and the value of the voltage supplied by this source are such as to render the diode 37 conductive during this time. The diode 37 and the bias source 38 together form so low an impedance between the anode and earth for the chrominance signal applied to the control grid during this period that this signal substantially does not appear at the output 39. The large direct current flowing through the tube also produces a voltage drop across the potentiometer 30 exceeding the voltage of the source 32. The polarity of the diode 31 is such that the diode is cut off under these conditions. When the diode 31 is cut off and the diode 37 is conducting the keying tube acts as a cathode follower for the chrominance signal. This signal is fed through the output 33 to the synchronous demodulators 21.

When a negative-going keying pulse is applied to the control grid of the tube 29 the current through this tube is reduced. The voltage drop across the resistors 30 and 36 decreases so that the voltage at the anode increases in an amount such that the diode 37 is cut off, and also the voltage set up at the cathode decreases in an amount such that the diode 31 is rendered conductive. Under these circumstances the keying tube acts as a voltage amplifier for the color synchronizing signal applied to the control grid during this period. The resulting amplified signal is fed through the capacitor 35 and the balancing transformer 34 to the output 39. The signal available at this output is used as a reference voltage for the phase detector 19.

The circuit arrangement described thus has the advantage that the tube 29 acts not only as a switch but also under all conditions as a power amplifier. The tube acts as a voltage amplifier for the signal to be taken from the output 39 and as a current amplifier for the signal to be taken from the output 33. The low output impedance of the chrominance channel 33 is of particular importance when synchronous demodulators having a low input impedance (for example, ring demodulators) are used.

It should be noted that the series circuit comprising the diode 37 and the bias source 38 for signals fed to the tube is effectively connected in parallel with that part of the anode impedance comprising the balancing transformer 34 and the RC network 35–36, for the internal resistance of the supply voltage source is very small for these signals. Hence, the circuit arrangement is substantially not changed if the diode 37 is connected in series with a suitably chosen bias source between the anode of the tube and the positive terminal of the supply voltage source. Similarly the diode 31 may be connected in series with a suitably chosen bias source between the cathode of the tube and the positive terminal of the supply voltage source.

The bias sources shown may be replaced by a potentiometer circuit comprising a resistor provided with a tapping and connected between the two terminals of the supply voltage source. The tapping is connected to the diode and a suitably chosen capacitor is connected between the tapping and earth so that between the said points there is a low impedance for the signal to be keyed.

A second embodiment of a circuit arrangement in accordance with the invention is shown in FIGURE 2, like circuit elements being designated as far as possible by reference numerals corresponding to those of FIGURE 1.

In this circuit arrangement positive keying pulses 45 are applied to the control grid of the keying tube during the occurrence of the color synchronizing signal in the color information signal. During the occurrence of these pulses the current flowing through the tube and hence the voltage drops across the resistors 30 and 36 are large. The large voltage drop across the resistor 36 results in a low anode voltage. A diode 47 is connected between the anode of the tube and a bias source (in the form of a RC network 42–43) with a polarity such that this diode is cut off under the influence of the low anode voltage during the occurrence of the keying pulses.

At the same time the voltage drop across the potentiometer circuit 30 exceeds the bias set up across a RC network 40–41. A diode 46 is connected between the cathode of the tube and the RC network 40–41 so as to be conductive during the occurrence of the keying pulses. When the diode 47 is cut off and the diode 46 is conductive the tube 29 acts as a voltage amplifier; hence, the color synchronizing signal present during the occurrence of keying pulses is available in amplified form at the output 39 similarly to the embodiment shown in FIGURE 1 but with the use of positive keying pulses.

When the keying pulse disappears the anode voltage at the tube increases in a degree such that the diode 47 is rendered conductive and at the same time the cathode voltage decreases in a degree such that the diode 46 is cut off; hence the tube 29 acts as a cathode follower for the chrominance signal similarly to the embodiment of FIGURE 1.

An advantage of the circuit arrangement shown in FIGURE 2 as compared to that shown in FIGURE 1 is that it enables the bias sources 32 and 38 to be replaced by RC networks (40–41 and 42–43) which automatically provide the bias for the diodes. The capacitor 41 or 43 is charged during the time in which the diode 46 or 47 is conductive and is discharged through the resistor 40 or 42 respectively during the time in which the diode is cut off.

The time constant of such a RC network must be large as compared with the pulse repetition period of the keying pulses in order to prevent the capacitor from being discharged in a degree such during the time in which the diode is required to be cut off that this diode is rendered conductive by the color information signal applied to it. However, this time constant should not be excessive to prevent the bias voltage from increasing to a value causing the diode to be cut off by the instantaneous color information signal during the time in which it is required to be conductive.

If a particularly large amplification of the color synchronizing signal is desired, a circuit arrangement in which positive keying pulses are applied to the control grid, as shown in FIGURE 2, is to be preferred to a circuit arrangement in which negative keying pulses are applied to the control grid (FIGURE 1), for during a positive keying pulse the current flowing the tube is large and since the mutual conductance of a tube increases with the anode current the amplification during the pulse is larger with positive pulses than with negative pulses. If the pulse duration of the keying pulses is small compared to the pulse repetition period especially large keying pulses may be applied which drive the tube into the range which it is not allowed to use with pulses having a greater duration in view of the maximum admissible anode dissipation of the tube. This enables an especially large amplification by the tube to be obtained.

If a lower degree of amplification of the color synchronizing signal than that provided by the circuit arrangements shown in FIGURES 1 and 2 is sufficient and it is also permissible for a slight part of the color synchronizing signal to penetrate to the output channel 33 for the chrominance signal, the circuit arrangement shown in FIGURES 1 and 2 may be simplified by omitting the diode 31 or 46 and the bias source 32 or the RC network 40–41 respectively. This simplification does not alter the cathode follower effect of the circuit arrangement in the absence of the keying pulses. In this case neither the separation of the chrominance signal from the color synchronizing signal nor the power amplification for the chrominance signal are adversely affected.

However during the occurrence of keying pulses, that is to say, when the keying tube acts as an amplifier for the color synchronizing signal, the potentiometer circuit 30 remains included in the cathode lead of the tube. Although the impedance of this circuit is small compared to the impedance present in the anode lead during this time, it nevertheless provides a certain amount of negative feedback and hence of reduction of the amplification. In addition, a small part of the color synchronizing signal still reaches the output of the chrominance signal.

Circuit arrangements similar to those shown in FIGURES 1 and 2 may be used in which the keying pulses are applied to the cathode of the keying tube instead of to the control grid. An addition circuit as formed by the capacitor 27 and the resistor 28 is then dispensed with, however, the low resistance cathode impedance of the keying tube in this case is a heavy load for the circuit from which the keying pulses are taken, and further measures have to be taken to prevent this circuit from offering a short-circuit for the chrominance signal in parallel with the cathode impedance.

Finally it should be noted that the invention is not restricted to circuit arrangements in which the keying tube is a triode. Multigrid tubes may also be used. However, both the color information signal and the keying pulses have to be applied to control electrodes by which not only the anode current but also the cathode current may be influenced.

Transistors may also be employed in a circuit arrangement in accordance with the invention. If the keying tube is replaced by a pnp-transistor, the polarities of the supply voltage source, the bias sources and the diodes must be reversed. When the tube is replaced by a npn-transistor the polarities of the said circuit elements are not changed.

What is claimed is:

1. A circuit for separating first and second alternately occurring signals from a composite signal, said circuit comprising an amplifying device having input, common and output electrodes, a source of said composite signal, a source of keying pulses which coincide with said second signal, means for applying said composite signal and keying pulses to said input electrode, a source of operating potential having first and second terminals, first output impedance means connected between said output electrode and first terminal, second output impedance means connected between said common electrode and second terminal, first and second unidirectionally conductive means, means connecting like terminals of said first and second unidirectionally conductive means to said output and common electrodes respectively, and bias means connected to the other terminals of said unidirectionally conductive means whereby only one of said unidirectonally conductive means is conductive in the presence of a keying pulse and only the other unidirectionally conductive means is conductive in the absence of a keying pulse.

2. A circuit for separating first and second alternately occurring signals from a composite signal, said circuit comprising an amplifying device having input, common and output electrodes, a source of said composite signal, a source of keying pulses which coincide with said second signal, means for applying said composite signal and keying pulses to said input electrode, a source of operating potential having first and second terminals, first output impedance means connected between said output electrode and first terminal, second output impedance means connected between said common electrode and second terminal, first and second unidirectionally conductive means, means connecting like terminals of said first and second unidirectionally conductive means to said output and common electrodes respectively, bias means connected to the other terminal of said first unidirectionally conductive means whereby said first unidirectionally conductive means conducts only when the absolute potential at said output electrode is below a first predetermined level, and bias means connected to the other terminal of said second unidirectionally conductive means whereby said second unidirectionally conductive means conducts only when the absolute potential at said common electrode is below a second predetermined level, said keying pulse having an amplitude whereby the potential at only one of said output and common electrodes is below said first and second predetermined level respectively in the absence of a keying pulse and the potential at only the other of said output and common electrodes is below said first and second predetermined level respectively in the presence of said keying pulse.

3. A circuit for separating first and second alternately occurring signals from a composite signal, said circuit comprising an amplifying device having input, common and output electrodes, a source of said composite signal, a source of keying pulses which coincide with said second signal, means for applying said composite signal and keying pulses to said input electrode, a source of operating potential having first and second terminals, first output impedance means connected between said output electrode and first terminal, second output impedance means connected between said common electrode and second terminal, first and second unidirectionally conductive means, means connecting like terminals of said first and second unidirectionally conductive means to said output and common electrodes respectively, bias means connected in the other terminal of said first unidirectionally conductive means whereby said first unidirectionally conductive means conducts only when the absolute potential at said output electrode is above a first predetermined level, and bias means connected to the other terminal of said second unidirectionally conductive means whereby said second unidirectionally conductive means conducts only when the absolute potential at said common electrode is above a second predetermined level, said keying pulse having an amplitude whereby the potential at only one of said output and common electrodes is above said first and second predetermined level respectively in the absence of said keying pulse, and the potential at only the other of said output and common electrodes is above said first and second predetermined level respectively in the presence of said keying pulse.

4. A circuit for separating first and second alternately occurring signals from a composite signal, said circuit comprising an amplifying device having input, common and output electrodes, a source of said composite signal, a source of keying pulses which coincide with one of said first and second signals, means for applying said composite signal and keying pulses to said input electrode, a first output circuit connected to said output electrode comprising a first series circuit of first unidirectionally conductive means and first bias means, and means connecting said first series circuit in parallel with a first output impedance, a second output circuit connected to said common electrode comprising a second series circuit of second unidirectionally conductive means and second bias means, and means connecting said second series circuit in parallel with a second output impedance, said unidirectionally conductive means being poled whereby only one of said unidirectionally conductive means is conductive in the presence of said keying pulses and only the other of said unidirectionally conductive means is conductive in the absence of said keying pulses and means for deriving said first and second signals from said output and common electrodes respectively.

5. The circuit of claim 4, in which said bias means are parallel connected resistor and capacitor means.

6. A circuit for separating first and second alternately occurring signals from a composite signal, said circuit comprising an electron discharge device having at least a control grid, a cathode and an anode, a source of keying pulses which coincide with said second signal, means for applying said composite signal and keying pulses to said control grid, a source of operating potential having positive and negative terminals, first output impedance means connected between said anode and positive terminal, second output impedance means connected between said cathode and negative terminal, first and second unidirectional current means having their cathodes connected to said anode and cathode respectively, said keying pulses having negative polarity, means providing positive bias connected to the anodes of said unidirectional current means whereby said first unidirectional current means conducts only in the absence of said keying pulses and said second unidirectional current means conducts only in the presence of said keying pulses, and means for deriving said first and second signals from said cathode and anode respectively.

7. The circuit of claim 6, in which said first impedance means comprises a parallel connected resistor and capacitor, and the primary winding of a transformer, connected in that order, between said anode and positive terminal.

8. A circuit for separating first and second alternately occurring signals from a composite signal, said circuit comprising an electron discharge device having at least a control grid, a cathode and an anode, a source of keying pulses which coincide with said second signal, means for applying said composite signal and keying pulses to said control grid, a source of operating potential having positive and negative terminals, first output impedance means connected between said anode and positive terminal, second output impedance means connected between said cathode and negative terminal, first and second unidirectional current means having their anodes connected to said anode and cathode respectively, said keying pulses having positive polarity, means providing positive bias connected to the cathodes of said unidirectional current means whereby said first unidirectional current means conducts only in the absence of said keying pulses and said second unidirectional current means conducts only in the presence of said keying pulses, and means for deriving said first and second signals from said cathode and anode respectively.

9. The circuit of claim 8, in which said first impedance means comprises a parallel connected resistor and capacitor, and the primary winding of a transformer, connected in that order, between said anode and positive terminal.

10. The circuit of claim 8, in which said means providing positive bias comprises separate parallel combinations of resistance and capacitance means connected between said negative terminal and the cathodes of said unidirectional current means.

11. A color television circuit for the separation of color synchronization signals from chrominance signals which occur alternately in a color information signal, comprising a source of said color information signal, a source of keying pulses which coincide with said synchronization signals, an amplifying device having input, common and output electrodes, means applying said color information signal and keying pulses to said input electrode, a source of operating potential having first and second terminals, first output impedance means connected between said output electrode and first terminal, second output impedance means connected between said common electrode and first terminal, means for shorting said first output impedance means only in the absence of said keying pulses comprising a first series circuit of first unidirectional current means and first bias means, and means connecting said first series circuit in parallel with said first impedance means whereby said first unidirectional current device conducts only in the absence of keying pulses, means for shorting said second output impedance means only in the presence of said keying pulses comprising a second series circuit of a second unidirectional current device and second bias means, means connecting said second series circuit in parallel with said second impedance means, whereby said second unidirectional current means conducts only in the presence of said keying pulses, and means for deriving said chrominance signal from said common electrode and said synchronization signal from said output electrode.

References Cited by the Examiner

UNITED STATES PATENTS

| | | | |
|---|---|---|---|
| 2,222,933 | 11/1940 | Blumlein | 178—6 |
| 2,297,612 | 9/1942 | Faudell | 178—7.3 |
| 2,743,311 | 4/1956 | Richman | 178—5.4 |
| 2,801,280 | 7/1957 | Janssen | 178—7.3 |
| 2,885,464 | 5/1959 | Loughlin | 178—5.4 |
| 2,917,575 | 12/1959 | Heuer | 178—5.4 |

DAVID G. REDINBAUGH, *Primary Examiner.*

ROBERT SEGAL, *Examiner.*